(12) United States Patent
Voigt

(10) Patent No.: US 10,384,297 B2
(45) Date of Patent: Aug. 20, 2019

(54) METHOD AND DEVICE FOR JOINING A COMPOSITE SHEET METAL COMPONENT TO A FUNCTIONAL ELEMENT

(71) Applicant: VOLKSWAGEN AKTIENGESELLSCHAFT, Wolfsburg (DE)

(72) Inventor: Alexander Voigt, Parthenstein (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 423 days.

(21) Appl. No.: 15/309,765

(22) PCT Filed: Apr. 22, 2015

(86) PCT No.: PCT/EP2015/058639
§ 371 (c)(1),
(2) Date: Jan. 12, 2017

(87) PCT Pub. No.: WO2015/169587
PCT Pub. Date: Nov. 12, 2015

(65) Prior Publication Data
US 2018/0085846 A1    Mar. 29, 2018

(30) Foreign Application Priority Data

May 9, 2014 (DE) .................. 10 2014 208 706

(51) Int. Cl.
| | |
|---|---|
| B23K 11/16 | (2006.01) |
| B23K 11/11 | (2006.01) |
| B23K 11/10 | (2006.01) |
| B23K 11/31 | (2006.01) |
| B32B 7/05 | (2019.01) |
| B23K 9/20 | (2006.01) |
| B23K 11/00 | (2006.01) |

(Continued)

(52) U.S. Cl.
CPC .............. *B23K 11/31* (2013.01); *B23K 9/201* (2013.01); *B23K 11/0046* (2013.01);
(Continued)

(58) Field of Classification Search
CPC .................. B23K 11/16; B23K 11/115; B23K 11/10–115
See application file for complete search history.

(56) References Cited

U.S. PATENT DOCUMENTS

| | | | |
|---|---|---|---|
| 4,650,951 A | 3/1987 | Koga et al. | |
| 8,047,593 B2 * | 11/2011 | Fuchs | B23K 11/11 296/30 |

(Continued)

FOREIGN PATENT DOCUMENTS

| | | |
|---|---|---|
| CN | 103534054 A | 1/2014 |
| CN | 103702792 A | 4/2014 |

(Continued)

OTHER PUBLICATIONS

Search Report for PCT International Patent Appl. No. PCT/EP2015/058639, dated Sep. 17, 2015.
(Continued)

*Primary Examiner* — Michael A Laflame, Jr.
(74) *Attorney, Agent, or Firm* — Pearl Cohen Zedek Latzer Baratz LLP

(57) ABSTRACT

In order to further improve a method for joining a multilayer component (10) to another component (11) in a way that allows the multilayer component (10) to be mechanically and electrically joined to other elements, it is provided that an intermediate layer (14) of the multilayer component (10) be displaced in the region of the joining site (32), and that the two outer structural elements (12, 13) of the multilayer
(Continued)

Figure 1A:
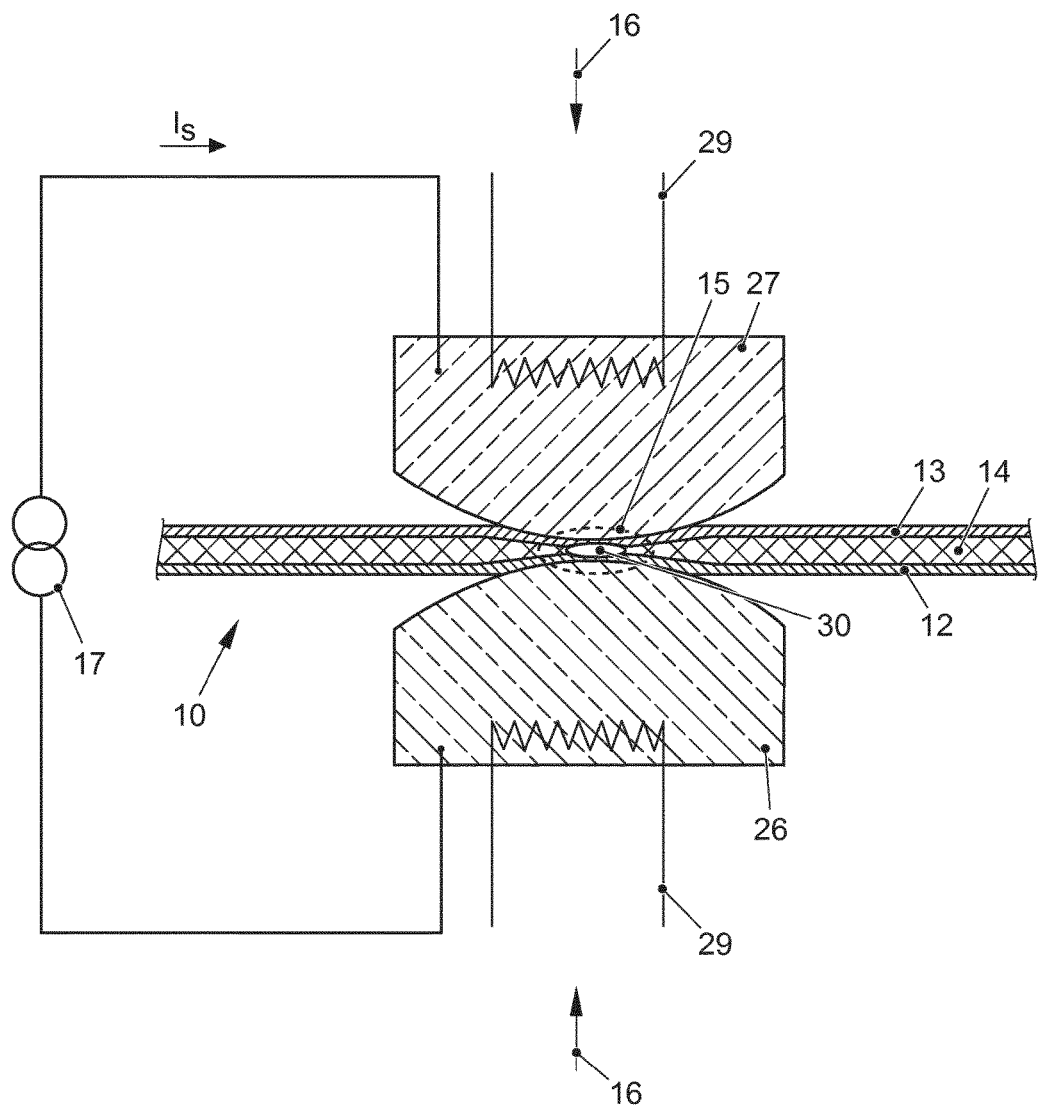

component be joined to one another by applying an electric voltage; and that the other component (11) be joined as a fastening element to the multilayer component (10) in the region of the joining site (32).

7 Claims, 8 Drawing Sheets

(51) Int. Cl.
| | |
|---|---|
| *B23K 11/30* | (2006.01) |
| *B32B 15/08* | (2006.01) |
| *B32B 27/32* | (2006.01) |
| *B32B 27/34* | (2006.01) |
| *F16B 37/06* | (2006.01) |
| *B23K 101/00* | (2006.01) |
| *B23K 101/18* | (2006.01) |
| *B23K 103/04* | (2006.01) |
| *B23K 103/16* | (2006.01) |

(52) U.S. Cl.
CPC ........ *B23K 11/0066* (2013.01); *B23K 11/163* (2013.01); *B23K 11/3018* (2013.01); *B23K 11/314* (2013.01); *B32B 7/05* (2019.01); *B32B 15/08* (2013.01); *B32B 27/32* (2013.01); *B32B 27/34* (2013.01); *F16B 37/061* (2013.01); *B23K 2101/006* (2018.08); *B23K 2101/185* (2018.08); *B23K 2103/04* (2018.08); *B23K 2103/172* (2018.08); *B32B 2250/40* (2013.01); *B32B 2307/51* (2013.01); *B32B 2605/00* (2013.01)

(56) References Cited

U.S. PATENT DOCUMENTS

| | | | |
|---|---|---|---|
| 10,232,461 B2* | 3/2019 | Riether | B23K 11/0066 |
| 2016/0136880 A1* | 5/2016 | Matsuo | B23K 11/20 |
| | | | 411/82 |
| 2016/0262214 A1* | 9/2016 | Kondo | B29C 65/562 |

FOREIGN PATENT DOCUMENTS

| | | |
|---|---|---|
| DE | 2 137 784 A1 | 2/1972 |
| DE | 101 11 567 A1 | 9/2002 |
| DE | 600 03 497 T2 | 5/2004 |
| DE | 10 2010 061 454 A1 | 6/2012 |
| DE | 10 2011 052 110 A1 | 1/2013 |
| DE | 10 2011 100 495 B4 | 1/2013 |
| DE | 10 2011 109 708 A1 | 2/2013 |
| DE | 10 2011 054 362 A1 | 4/2013 |
| DE | 10 2011 055 654 A1 | 5/2013 |
| DE | 10 2012 106 378 A1 | 1/2014 |
| DE | 10 2012 106 521 A1 | 1/2014 |
| DE | 10 2012 109 046 A1 | 4/2014 |
| FR | 2638668 A3 | 5/1990 |
| FR | 2 711 568 A1 | 5/1995 |
| FR | 2 892 037 A1 | 4/2007 |
| JP | S57 187185 A | 11/1982 |
| JP | 61-115687 A | 6/1986 |
| WO | WO 2013 020636 A1 | 2/2013 |

OTHER PUBLICATIONS

Office Action for Chinese Patent Application No. 201580024391.3, dated Apr. 4, 2018.

* cited by examiner

METHOD AND DEVICE FOR JOINING A COMPOSITE SHEET METAL COMPONENT TO A FUNCTIONAL ELEMENT

CROSS-REFERENCE TO RELATED APPLICATIONS

This application is a National Phase Application of PCT International Application No. PCT/EP2015/058639, International Filing Date Apr. 22, 2015, claiming priority of German Patent Application No. 10 2014 208 706.6, filed May 9, 2014, which is hereby incorporated by reference in its entirety.

BACKGROUND OF THE INVENTION

The present invention relates to a method for joining a first component to a second component at a joining site of the first component, the first component having at least an essentially planar first structural element, an essentially planar second structural element, and a plastic-containing intermediate layer disposed at least in certain regions between the two structural elements.

The present invention also relates to a structural element composite including a first component and a second component that is joined to the first component at a joining site thereof.

The present invention also relates to a device for preparing a joining site on a first component to join the first component to a second component at the joining site of the first component.

Lightweight design concepts based on aluminum materials or composite sheet-metal components, for example, are known in automobile manufacturing. Combining high strength steels for crash-related components with multilayer composite panels for large-area components results in a lightweight design concept that is more economical than aluminum materials, particularly in body manufacturing. Composite panels are typically made of thin, for example, of 0.2 mm to 0.3 mm steel cover plates and of a plastic-containing intermediate layer made of thermoplastic plastic, for example, typically having a thickness of between 0.2 mm and 1.5 mm. The weight per unit area is thereby appreciably less than other known automotive body sheet metals. Another advantage of such composite sheet-metal components is the high flexural strength thereof.

The intermediate layer disposed between the two thin steel cover plates is electrically insulating and, thus, not suited for resistance welding, arc welding or beam welding. It is, therefore, necessary to improve mass-production joining technologies to enable such composite sheet-metal components to be used in body manufacturing. However, thermal joining processes cannot be employed with high process reliability because of the intermediate layer. The high process temperatures cause considerable foaming and spattering, and damage to the composite sheet-metal component. Also, sheet metal-type components and functional elements, for example, fastening elements, such as bolts and nuts cannot be integrally attached because of the intermediate layer. The intermediate plastic layer reduces the joining strength when functional elements, for example, fastening elements, are mechanically joined. The clamping force produced in the joining process between the composite sheet-metal component and a functional element can be reduced by creep processes in the intermediate layer material at temperatures within the range of approximately 180° in the cathodic dip painting process.

Therefore, today's state of technological development dictates that sheet metal-type components preferably be mechanically joined to the composite sheet-metal component. Joining methods for joining composite sheet-metal components to functional elements, for example, fastening elements, such as bolts and nuts, are not yet known under the related art.

To weld together multilayer composite panels, the German Patent Application DE 101 11 567 A1 already describes manufacturing components partially without an insulating intermediate layer. Resistance spot welding can be used at those locations.

The German Patent Application DE 10 2011 054 362 A1 describes a method for manufacturing a composite sheet-metal component having a metallic edge region; the component having two outer cover plates of metal and at least one layer made of a plastic disposed therebetween.

To prepare a joining site, the International Patent Application WO 2013/020 636 A1 describes a method for joining sheet metal-type structural elements having an intermediate layer of thermoplastic plastic. It provides for melting and displacing the intermediate layer in certain regions and for producing a material-to-material bond of the two structural elements by welding. For this, upon displacement of the intermediate layer, a welding current is applied in one region until at least one of the two structural elements is heated to above the melting point thereof and partially liquefies. A material-to-material bond can be produced in this way between the two structural elements.

SUMMARY OF THE INVENTION

It is an object of the present invention to improve a method for joining a multilayer component to another component in a way that allows the multilayer component to be mechanically and electrically joined to other elements, whereby an intermediate layer of the multilayer component contains plastic.

This objective is achieved by a method for joining a first component to a second component at a joining site of the first component. The first component features at least an essentially planar first structural element and an essentially planar second structural element, as well as a plastic-containing intermediate layer disposed in certain regions between the two structural elements.

Thus, the present invention provides that the first component be multilayered, preferably formed as a composite sheet-metal component. In the context of the present invention, a planar formation is understood to mean that the longitudinal and/or widthwise extent is greater than the thickness of the component. Both structural elements of the first component are sheet metal-type structural elements that preferably contain steel, for example. The plastic-containing intermediate layer is electrically insulating and preferably elastic or thermoplastic. It is especially preferred that the plastic-containing intermediate layer be made of polyethylene or polyamide or of a combination thereof.

The method according to the present invention for joining, respectively bonding the two components in the region of the joining site of the first component includes steps a) through c) in accordance with claim 1. In the context of the present invention, the bonding of components is understood to be the joining of components.

A contact between the two components in the region of the joining site is understood to mean that the two structural elements contact one another in this region, since the intermediate layer had been displaced in this region in step a). In step a), the first and/or second structural element are/is preferably heated in the region of the joining site to displace the intermediate layer. Subsequently to or during heating, a compressive force is preferably exerted on the first and/or second structural element in the region of the joining site until intermediate layer (14) in the region of the joining site (15) between first structural element (12) and second structural element (13) is displaced.

Thus, in step b), the electric voltage is applied to make an electrical contact between the two structural elements. It is thus preferably provided that at least step b) not be executed, respectively that an electric voltage not be applied to the two structural elements until the contact between the two structural elements is established.

For example, the electric voltage may be applied to the two structural elements once a predefined time period has elapsed. The time span is defined in a way that makes it possible to assume reliably enough that a contact is made between the two structural elements in the region of the joining site by the displacement of the intermediate layer in step a). It is preferably provided that it be detected in step a) when the contact between the first structural element and the second structural element is made in the region of the joining site in order to apply the electric voltage in step b). Thus, the point in time when the electric voltage is applied is not dependent or at least not exclusively dependent on a predefined time span. It is especially preferred that a signal generated in response to detection of the contact be used in step b) for applying the electric voltage, respectively for initiating step b).

A test voltage is preferably used to detect the contact between the two structural elements. For this, a test voltage is applied to the two structural elements. Resistance measurement and/or current measurement are/is used to detect a contact between the two structural elements in the region of the joining site. Tools, for example, presses used in step a) and/or step b) may apply the test voltage.

Displacement measurement may also be used to detect the contact between the two structural elements. For this, to exert pressure in step b), the stroke, respectively displacement of at least one tool may be measured, for example. A contact may be made when the stroke of a tool, respectively the displacement thereof corresponds to the thickness of the intermediate layer in this region. When two tools are used for exerting pressure in step b), the two tools being moved in opposite directions, a contact may be made when the stroke of the two tools or the displacement of both corresponds in total to the thickness of the intermediate layer.

The process time for method step b) may be further reduced by adaptively controlling the current supply. It is preferably provided that the current flow be initiated immediately upon detection of a contact between the two structural elements.

Once steps a) and b) have been implemented, an electric conductivity is permanently ensured orthogonally through the layered structure of the first component since the material of the intermediate layer is permanently displaced in the region of the joining site. Therefore, these method steps a) and b) are referred to as method steps for preparing the joining site. Step c) includes the later joining process between the first multilayer component and another, namely the second component.

It is also preferably provided that a compressive force be exerted on the first structural element in step a) to form a depression on a surface of the first structural element in the region of the joining site. It is also preferably provided that the compressive force be exerted on the second structural element to allow a substantially flat, respectively plane surface to remain on a surface of the second structural element in the region of the joining site. It is thus preferably provided that the tools for exerting the compressive force be designed to form a depression merely on a side surface of the first component following displacement of the intermediate layer material. Thus, the opposite surface of the first component preferably remains plane, respectively flat.

The tools, for example, presses for exerting the compressive force in step b) are preferably also used for heating the first and/or second structural element. For this, the tools are subject to a temperature. It is especially preferred that different temperatures act on the tools for heating the first structural element and the second structural element. For example, a tool having an essentially plane pressure applying surface may be subject to a low temperature and a tool having a curved, for example, convex pressure applying surface to a higher temperature.

In step c), the second component is preferably joined in the region of the joining site of the first component by welding, for example, by resistance spot welding, arc stud welding or resistance projection welding.

The second component is in the form of a functional element, for example, a fastening element for connection to another component or element. The fastening element may be a nut, projection nut or bolt, for example. Another component or element may be attached, for example, bolted to or locked in position with such a functional element, respectively fastening element. To bolt another component or element to the fastening element, the fastening element, for example, the nut, may feature an internal thread or an external thread. Other components or elements that are attached to the fastening element may be electrical lines, such as ground leads, for example, or also cladding, such as interior cladding, fittings or the like. It is thus possible to avoid, respectively minimize the use of ground leads, for example. The need for additional ground leads is eliminated by connecting a ground connection, for example, from a headlight of a vehicle to a fastening element, which, in accordance with the method of the present invention, is connected to the first component and thus features an electrical connection to the first component. Thus, the ground connection may be established via the first component, respectively the surface of the first component.

It is also preferably provided in step c), before the first component is connected or joined to the second component, that a hole be bored through the first component in the region of the joining site. Thus, a subsequent screw connection may be prepared in the region of the site provided for joining the first component with another component. Alternatively, the hole may be punched through the first component in the region of the joining site. The hole forming or punching process may take place in a separate operation or be integrated into the tool for steps a) and b).

A second component, for example, a fastening element, may be configured in the hole formed through the first component in the region of the joining site and be mechanically joined to the first component. For example, a fastening element may be inserted through the hole in the first component, and locked in position, bonded or even welded. The fastening element disposed in the hole and joined to the first component preferably features an internal thread for accommodating a screw connection.

The voltage may be controlled in step b) to allow the two structural elements to be welded together in the region of the joining site. The temperature prevailing in the point of contact region between the two structural elements then rises above the melting temperature of the first and/or second structural element. The material of at least one of the two structural elements liquefies in this region. A material-to-material bond may be produced in this way between the two structural elements. A welding lens is formed in the bonding area.

The voltage in step b) is preferably controlled to not allow a temperature to rise above a predefined temperature threshold in the contact region between the first structural element and the second structural element. It is preferably thereby provided that the predefined temperature threshold be lower than the melting point of a material of the first structural element, as well as lower than the melting point of a material of the second structural element. Thus, the materials of the two structural elements are not liquefied by the heat in the contact region generated by the current flow. Thus, no partial or regional liquefaction of these materials is provided. In response to the supplying of current and the resultant heating, the material of both structural elements remains in the solid state. The heating resulting from the supplying of current and the exertion of the compressive force on one or both structural elements attaches the two structural elements to each other. Thus, a welding together of the two structural elements is preferably not provided, where the temperature in the contact region rises above the melting point of the materials of the two structural elements, to produce a material-to-material bond between the structural elements and this region. Because the two structural elements in the contact region are heated by the supplying of current only to the point where the material of the two structural elements does not liquefy, it is possible to provide a fastest possible and cost effective bonding and joining site preparation. The relatively low temperature makes it possible to substantially prolong the cycle time of the joining site preparation. Moreover, there is a significant reduction in the wear that tools used for the method, such as caps or electrode caps of specially manufactured or rebuilt electrode holders, are subject to.

The predefined temperature threshold is preferably lower than 1,600° C., especially lower than 1,530° C., and most preferably lower than 1,500° C.

During the preferred heating of one or both structural elements in step a), the structural element(s) on the surface, i.e., in the region in which the tempered tool heats the first structural element and/or the second structural element, is/are heated to a temperature of between 200° C. and 600° C.

The electric voltage is preferably applied in step b) until the intermediate layer is thermally destroyed due to a heating in a first region adjoining the joining site induced by an electric current flow.

The material of the intermediate layer displaced in the region of the joining site between the two structural elements is thus thermally destroyed in a first region, i.e., in a zone disposed about the joining site and between the two structural elements in such a way that the material of the intermediate layer is no longer able to flow even after cooling in this first region. Thus, the properties are modified by the heating of the intermediate layer material in such a way that the intermediate layer material in this region no longer has any flowable properties. The electric voltage is preferably applied or adjusted in step b) until the displaced material in the first region has hollow spaces at least regionally.

In a first process step, the preferred heating in step a) regionally plasticizes and melts the intermediate layer between the two structural elements. The intermediate layer may be heated, for example, by heat flowing through the structural elements into the intermediate layer from tools suited for that purpose, such as press dies, pressing tools or welding electrodes. The intermediate layer in this region is displaced in response to the preferred exertion of a force in step a). The temperature, as well as the compression force may influence the duration for heating the intermediate layer.

In dependence upon the tempered tools, for example, press dies, the joining site, respectively the region in which the intermediate layer is displaced between the two structural elements, may have any desired geometry. In addition, the geometry essentially depends on the form of the second component that is to be joined to the first multilayer component in step c). The joining site may be circular or strip-like in steps a) through c), for example. The diameter of the joining site is preferably between 2 and 20 mm for a later resistance spot welding process or an arc stud welding process. The diameter of the joining site may preferably be up to 30 mm for a later resistance projection welding of functional elements, for example, fastening elements, such as nuts or bolts.

It is preferably provided that steps a) and b) be continuously implemented along a predefined line, respectively path of the first component in order to form the joining site in a strip shape. In this context, the strip-like joining site may have a width of between 1 and 20 mm. The length of the strip-like joining site may be between 3 mm and the maximum length of the first component. The strip-like joining site may also be peripherally closed, for example, along a plurality of lateral edges, and thus be configured along four lateral edges of the first component. Thus, the strip-like joining site may also be configured along a part of the first component or also along the entire length or width of the first component. The strip-like joining site is preferably configured in the peripheral region of the first component. To configure a strip-like joining site in steps a) and b) continuously along a predefined line of the first component, preferably one, especially two roll-shaped tool(s) is/are provided. Thus, the strip-like joining site may be provided by using resistance roller seam welding. The roll-shaped tool(s) may feature one or more heating elements in order to input heat into one or both structural elements in the preferred manner in step a). In addition, the roll-shaped tool(s) may be designed for exerting a preferred compressive force onto one or both structural elements. It is also preferable that the roll-shaped tool(s) be designed for applying an electric voltage. Thus, both steps a) and b) for preparing the joining site may be implemented using one or both roll-shaped tools. The roll-shaped tools are thereby preferably moved at a predefined velocity and/or incrementally, respectively gradually along the one or both surfaces of the structural elements.

The present invention also provides a structural element composite including a first component and a second component that is joined at a joining site of the first component to the first component. The first component thereby has an at least essentially planar first structural element, an essentially planar second structural element, as well as a plastic-containing intermediate layer configured at least in certain regions between the two structural elements. The structural element composite according to the present invention is manufactured in accordance with a method as recited in claims 1 through 7.

The second component is in the form of a functional element, for example, a fastening element, for example, a nut, projection nut or bolt. The functional element, respectively the fastening element, may thereby be placed on the first component in the region of the joining site and be joined to the first component. Alternatively, in the region of the joining site, the second component may be inserted through a hole configured in the first component, and joined to the first component. The fastening element, for example, the nut, projection nut or the bolt may thereby be joined to the first component by a mechanical or also thermal process. The fastening element may be joined to the first component by arc stud welding, resistance projection welding or similar welding processes, for example. Moreover, the fastening element could be joined to the first component by a compression connection, particularly when the fastening element is placed in a hole in the region of the joining site.

It is also preferably provided that a maximum width of the fastening element be smaller than the maximum width or the diameter of the joining site. It is especially preferred that the maximum width of the fastening element be smaller than half of the maximum width or half of the diameter of the joining site. The maximum width of the fastening element may be an outside diameter of the fastening element, for example.

The present invention also provides a device for preparing a joining site on a first component to join the first component to a second component at the joining site of the first component. In accordance with the present invention, the device for preparing a joining site is adapted for implementing a method in accordance with claims 1 through 7.

The device for preparing a joining site preferably has a first pressure applying means for exerting a compressive force on the first structural element of the first component, as well as a second pressure applying means for exerting a compressive force on the second structural element of the first component. It is thereby preferably provided that one of the two pressure applying means have an essentially plane pressure applying surface. The other pressure applying means may feature any suitable pressure applying surface. The other pressure applying means may have a convexly formed pressure applying surface, for example. The convexly formed pressure applying surface of a pressure applying means forms a depression in this surface of the first component in response to exertion of a compressive force in step a). Because the other pressure applying means features an essentially plane pressure applying surface, the opposite outer surface of the first component continues to be plane, respectively flat following exertion of the compressive force in step a).

In addition, the pressure applying surface of one or both pressure applying means may preferably be strip-shaped. The pressure applying means may be in the form of a press, for example, a press die, or an electrode cap of a welding device. The pressure applying means may also be roll-shaped to form a strip-like joining site. One or both pressure applying means may feature heating elements for generating the heat for step a). Moreover, one or both pressure applying means may feature a detection means for detecting a contact between the two components during exertion of the compressive force in step a). It is especially preferred that at least one heating element be configured in a pressure applying means to have a high thermal conductivity at a first end, as well as a poor thermal conductivity at a second end. Thus, in the region of the first end, the heat may be transferred into one of the two structural elements very favorably. On the other hand, in the region of the second end, the heat is not conducted, respectively is only conducted very minimally into the device.

BRIEF DESCRIPTION OF THE DRAWING DRAWINGS

Figure 1B:
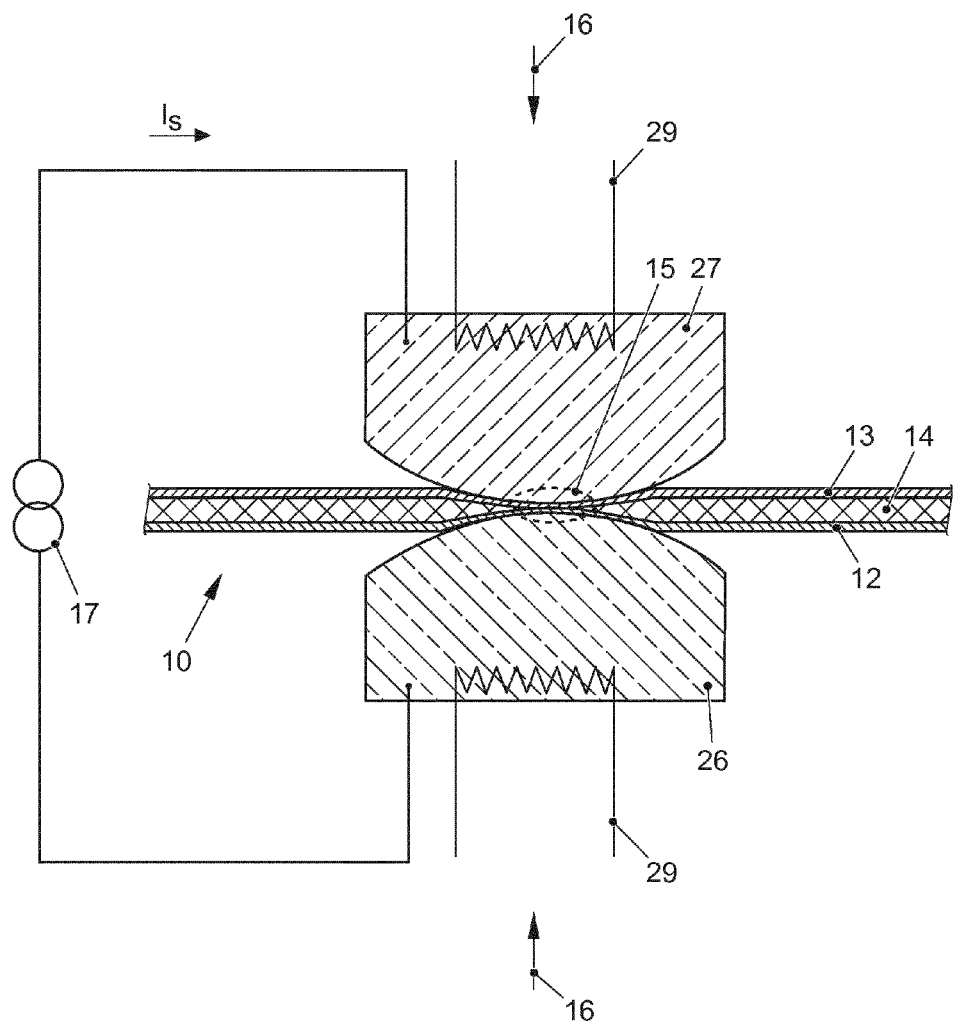
Figure 1C:
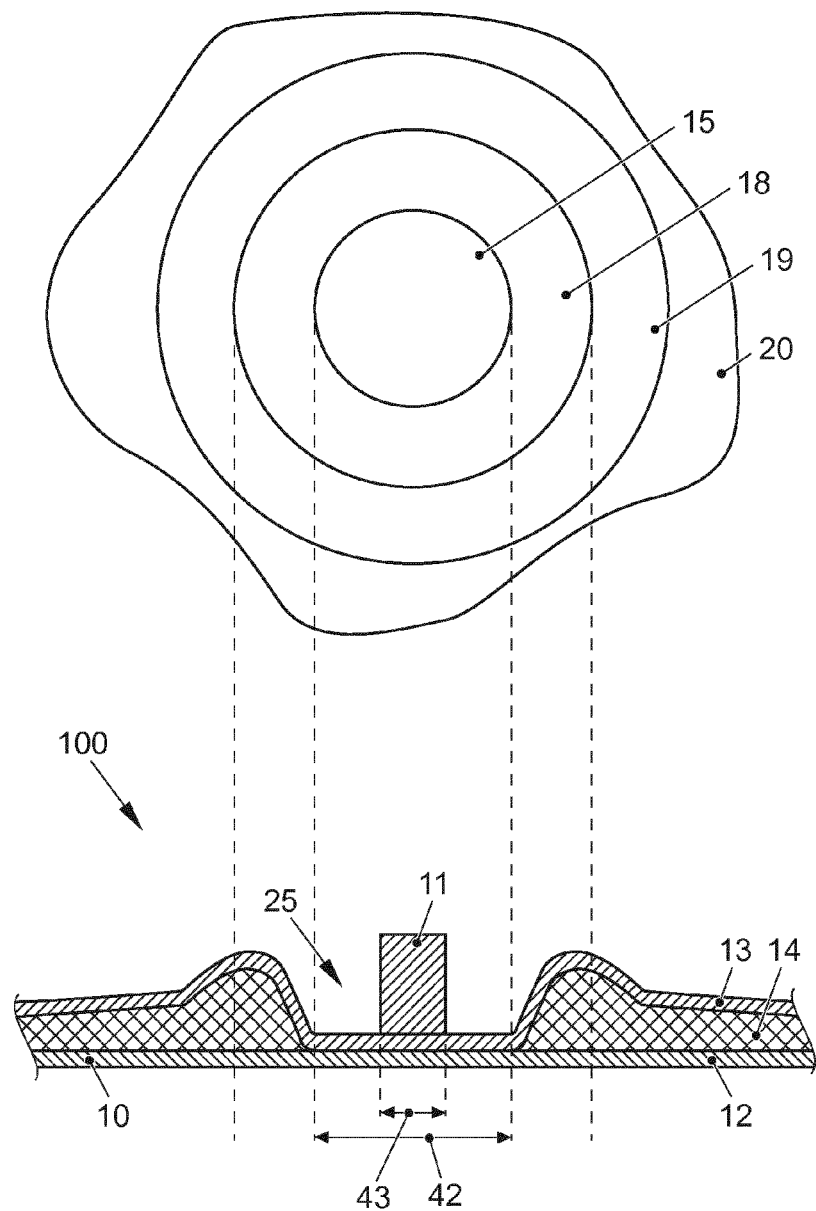
Figure 2A:
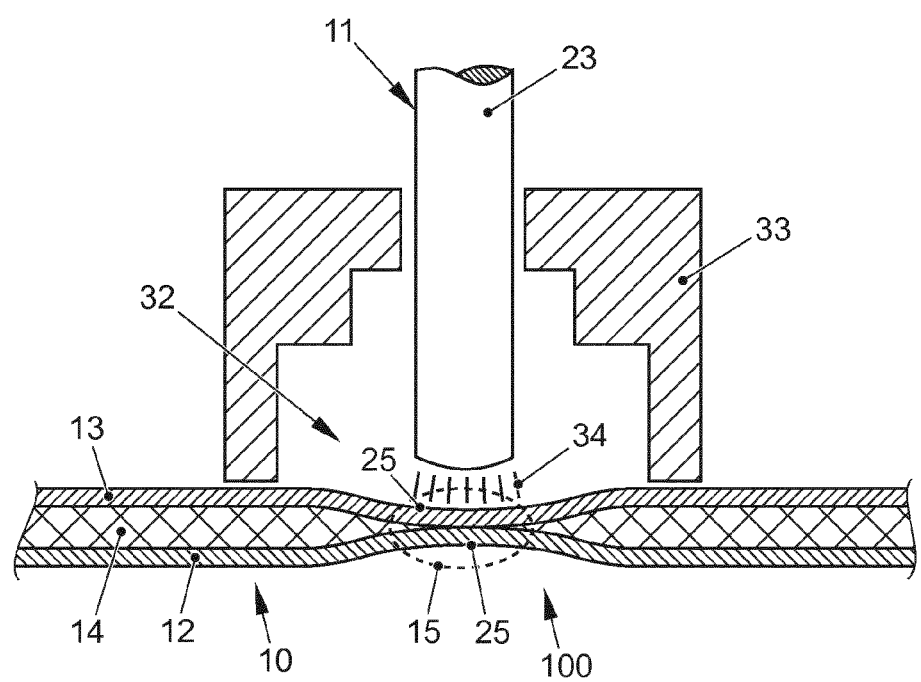
Figure 2B:
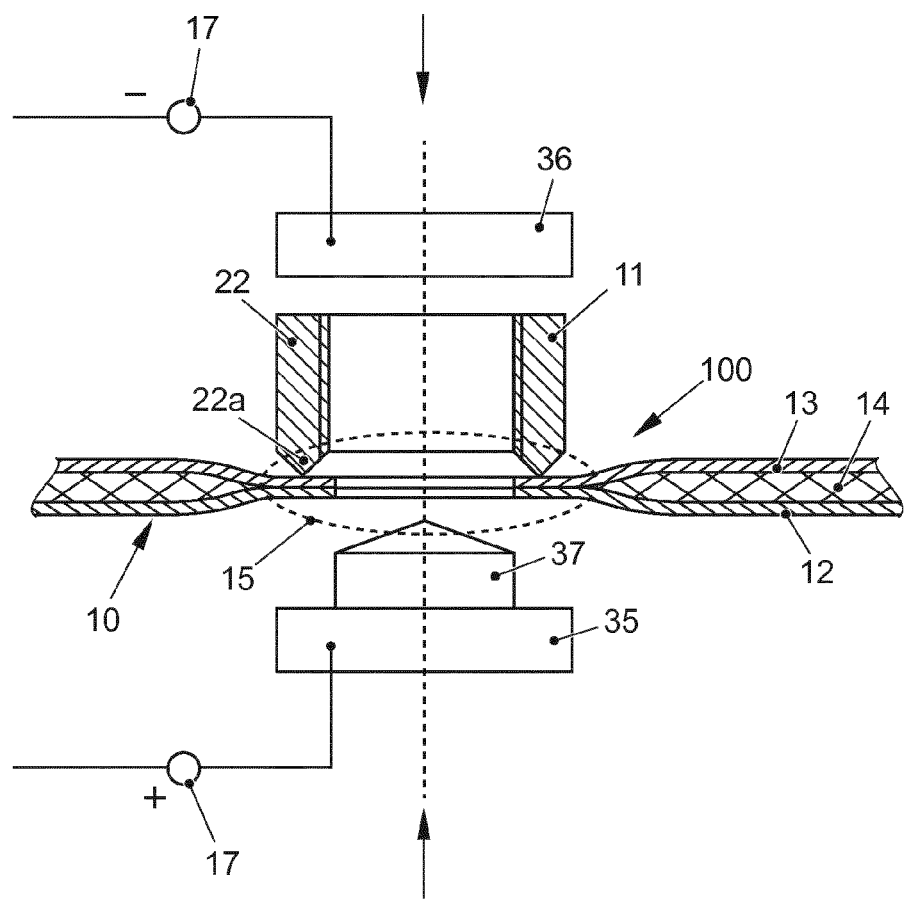
Figure 2C:
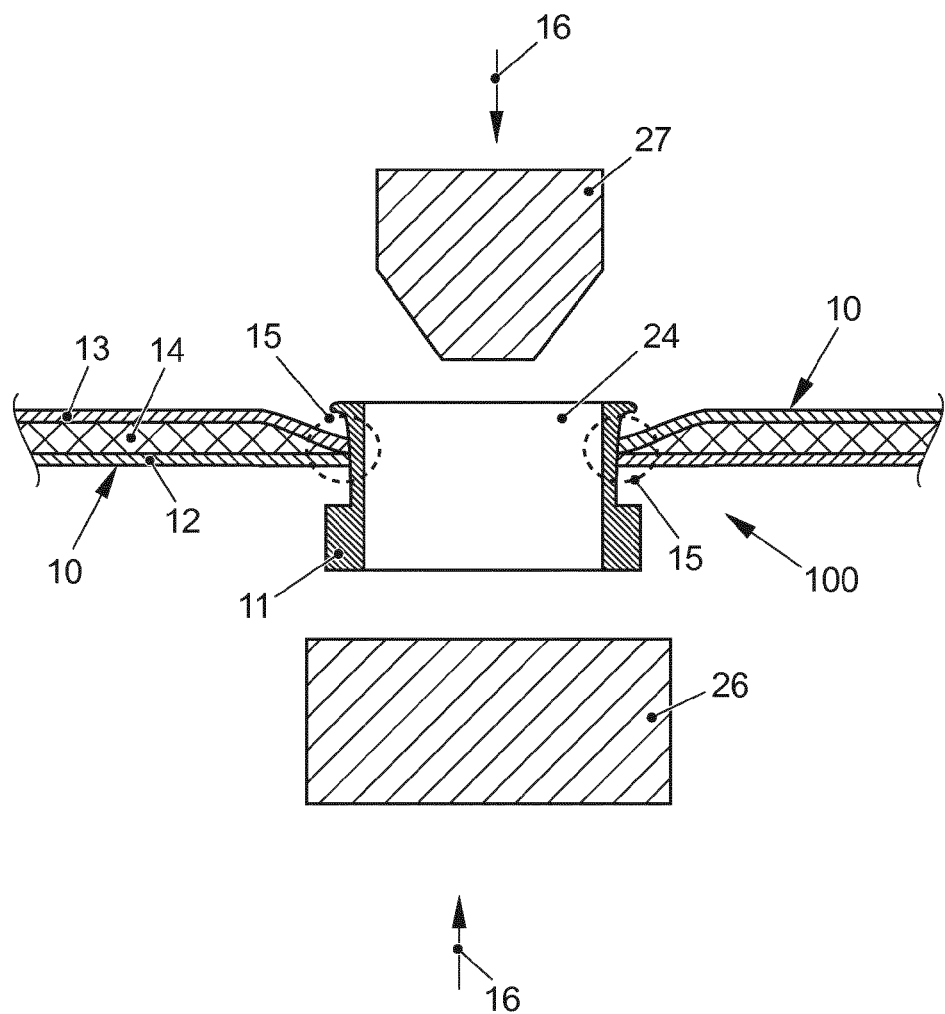
Figure 3C:
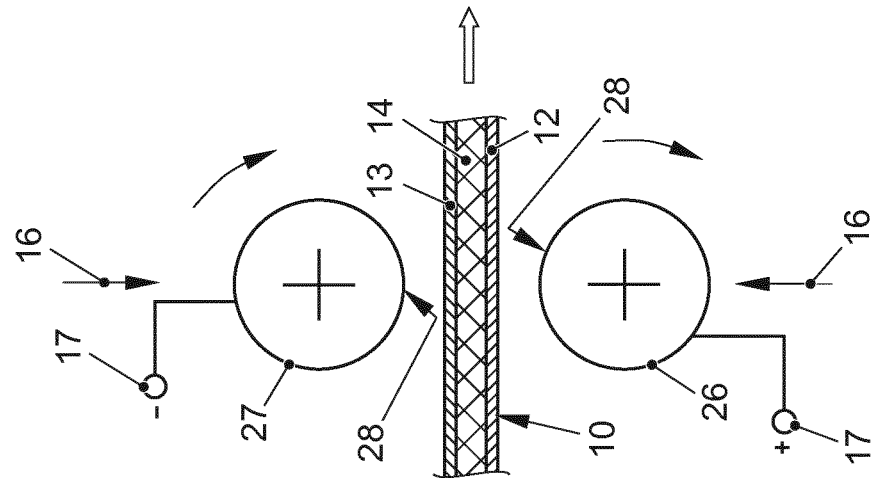
Figure 3B:
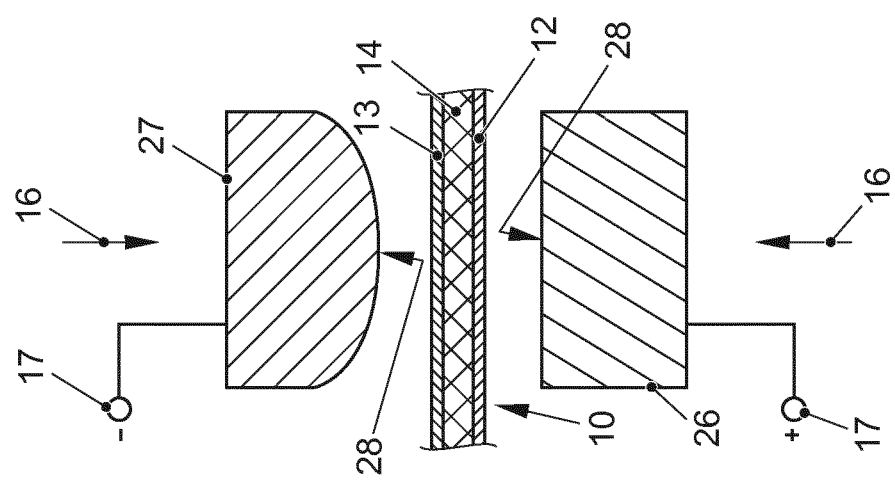
Figure 3A:
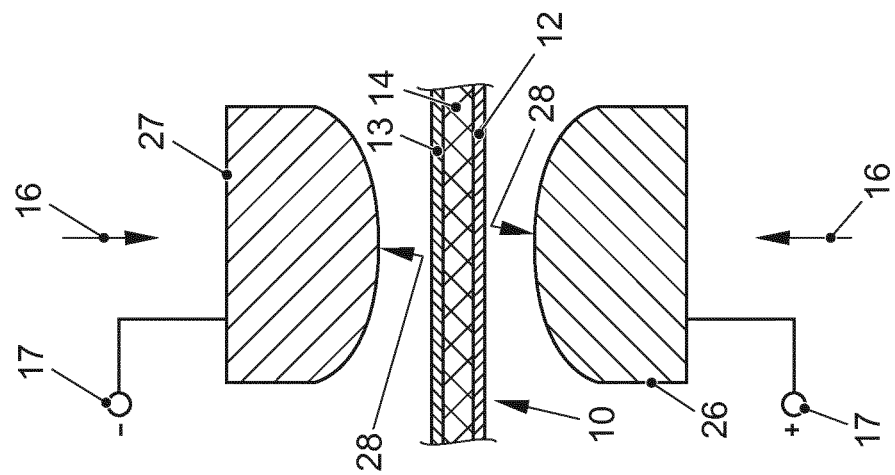
Figure 4:
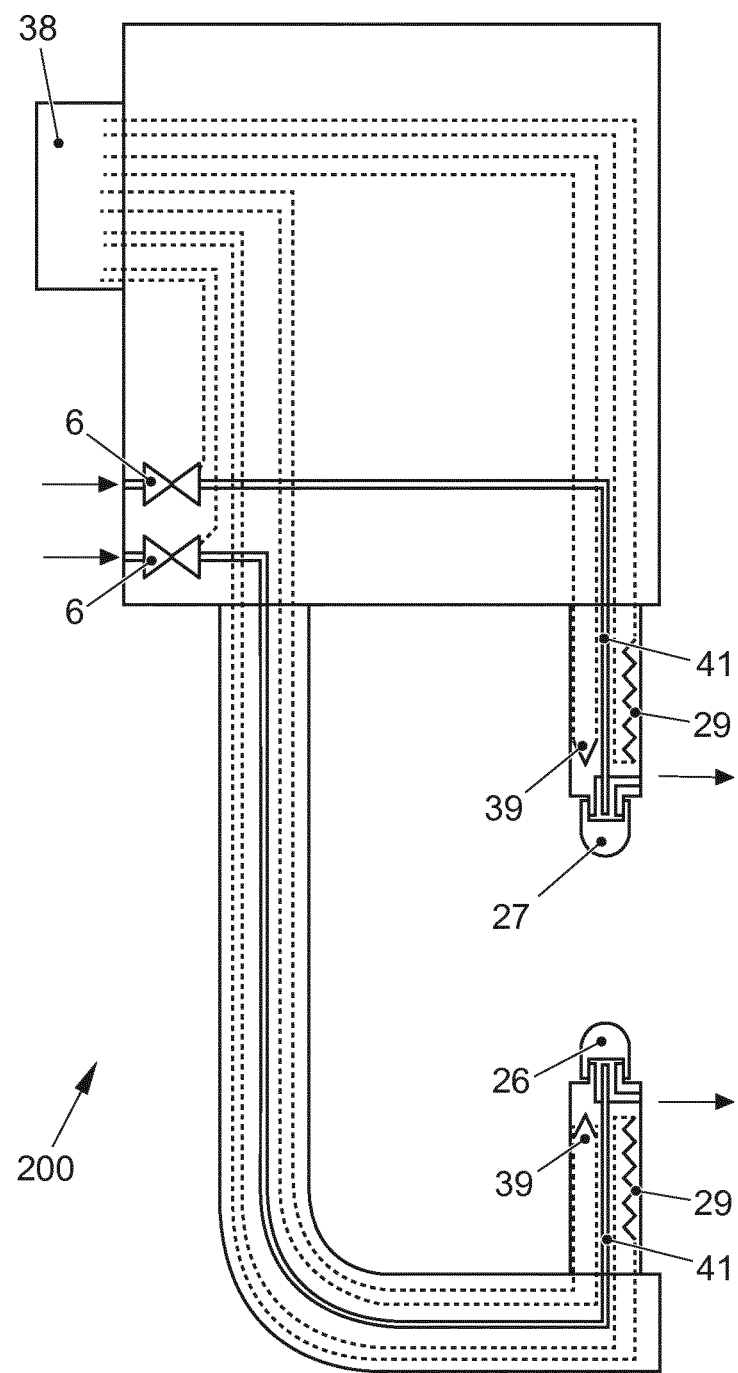

The figures show:

FIG. 1a-1b method steps a) and b) for preparing a joining site on a first multilayer component;

FIG. 1c the various zones in the region of the joining site;

FIG. 2a method step c) for joining a first component in the region of the prepared joining site to a second component in the form of a bolt;

FIG. 2b method step c) for joining first component in the region of the prepared joining site to a second component in the form of a nut;

FIG. 2c method step c) for joining the first component in the region of the prepared joining site to a second annular component placed in the hole through the first component;

FIGS. 3a-3c different embodiments of pressure applying means for implementing method steps a) through c); and FIG. 4 a device for preparing a joining site.

DETAILED DESCRIPTION

FIG. 1a-1b show method steps a) and b) for preparing a joining site 15 on a first component 10. First component 10 has a multilayer form and features two sheet metal-type structural elements 12, 13, as well as an intermediate layer 14 disposed between the two structural elements 12, 13. The intermediate layer is in the form of a plastic-containing layer. To join first component 10 to a second component 11 (not shown in FIG. 1a), the joining method provides that a joining site 15 be prepared before first component 10 is joined to a second component 11. For this purpose, it is essential that intermediate layer 14 be displaced in the region of joining site 15, allowing a contact to be formed between the two structural elements 12, 13 in this region.

Pressure applying means 26, 27 for exerting the compressive force in step a) may be electrode caps of a welding device, for example. In addition, different tools may be used for individual method steps a) and b). As illustrated in FIGS. 1a and 1b, the same tools, namely pressure applying means 26, 27 are used for method steps a) and b). For this, the two pressure applying means 26, 27 include heating elements 29, as well as connections for connecting an electric voltage 17.

In a first method step, the two pressure applying means 26, 27, that were heated in advance, are placed on the particular surface of a structural element 12, 13. Pressure applying means 26, 27 are warmed, respectively heated by heating elements 29 to a temperature of between 200° C. and 500° C.

In a second step, a compressive force 16 is exerted by the two pressure applying means 26, 27 on structural elements 12, 13 until intermediate layer 14 is displaced in the region of joining site 15 to be prepared between first structural element 12 and second structural element 13, and a contact is established between the two structural elements 12, 13.

As soon as a contact is established between the two structural elements 12, 13 in this region, an electric voltage 17 is applied to the two pressure applying means 26, 27. An electric current is thereby conducted orthogonally through the two structural elements 12, 13. The resistance heating heats the contact region between the two structural elements 12, 13 as a function of the current intensity level.

FIG. 1a shows the welding of the two structural elements 12, 13. Electric voltage 17 is controlled here in a way that liquefies the material of at least one structural element 12, 13 in the region of joining site 15. Thus, a material-to-material bond is produced between the two structural elements 12, 13. As shown in FIG. 1*a*, welding in the contact region forms a welding lens 30.

FIG. 1*b* shows method step b) without the formation of a welding lens 30. Electric voltage 17 is controlled to not allow the temperature prevailing in the contact region between the two structural elements 12, 13 to exceed a predefined temperature threshold 21. The two structural elements 12, 13 are in the form of sheet metals and have a melting point of approximately 1,530° C. To ensure that the two structural elements 12, 13 are not welded in this range, but are merely attached to each other, temperature threshold 21 is below the melting point of approximately 1,530° C. of the two structural elements 12, 13. Thus, no welding lens is formed by the resistance heating in the contact point region.

The resistance heating creates a heat flow in intermediate layer 14. This heat flow thermally destroys the material of displaced intermediate layer 14 in a first region 18 thereof, namely in the region directly adjoining joining site 15, in a way that causes the material in this region to lose its fluidity. Also, once pressing tool is released, respectively compressive force 16 is achieved, there is no unwanted return flow of intermediate layer 14 in the region of joining site 15.

FIG. 1*c* shows the region of joining site 15. The various regions 18, 19, 20 of displaced intermediate layer 14 around joining site 15 are thereby shown at the top of FIG. 1*c*. In the region of joining site 15, the material of intermediate layer 14 is completely displaced. In response to the resistance heating and the hereby induced thermal flow through the material of displaced intermediate layer 14, this material is thermally destroyed in a first region 18 in a way that causes it to lose its fluidity. Adjoining first region 18 is second region 19 of displaced intermediate layer 14. In this region, the material of intermediate layer 14 is merely thermally influenced. The material of intermediate layer 14 is not damaged or influenced in the remaining region, in third region 20 of displaced intermediate layer 14, nor in the region of non-displaced intermediate layer 14.

To prepare joining sites, pressure applying means 26, 27 of the type that merely place a depression 25 in second structural element 13 are used in the example shown in FIG. 1*c*. Second component 11, for example, may be disposed in this region and joined to first component 10, for example, welded thereto.

As second component 11, FIG. 1*c* shows a bolt 23 joined to first component 10. Thus, bolt 23 is configured in depression 25. On the opposite outer surface of first component 10, namely in the region of the surface of second structural element 13, a plane outer surface of first component 10 is retained by a pressure applying means 26 (not shown in FIG. 1*c*) suited for this purpose.

Maximum width 42 of joining site 15 is greater than maximum width 43 of second component 11, namely of bolt 23.

FIG. 2*a* through 2*c* show method step c) for joining first component 10 to a second component 11 in the region of prepared joining site 15.

Using arc stud welding, peg-shaped parts, for example, bolt 23, may be joined, respectively connected to planar first component 10 at prepared joining site 15. The type of arc initiation may be carried out by a tip ignition or a lift ignition. A welding rectifier or converter, welding transformer or condenser may be used as an energy source. The welding current intensity is within the range of from 100 A to 10,000 A. The welding time may be from 10 to 2,000 ms. The material of peg-shaped, second component 11, for example, of bolt 23 may include steel or chromium nickel steel. Second component 11 may thereby be metallically bare, galvanized or feature similar corrosion-inhibiting coatings. In addition, depending on the particular application, second component 11 may feature an oiling, respectively an applied oil coating. A peg-shaped second component 11, for example, a bolt 23, typically has a diameter of between 1 and 14 mm. This diameter typically has a range of between 3 and 8 mm. A peg-shaped second component 11, for example, a bolt 23, may be between 1 and 100 mm in length. Peg-shaped second component 11, for example, bolt 23, may thereby feature an external thread and/or an internal thread in some regions or over the entire length.

In FIG. 2*a* through 2*c*, second component 11 is designed as a functional element, in particular as a fastening element. In FIG. 2*a*, second component 11, namely the fastening element, is in the form of a bolt 23. In the region of prepared joining site 15, bolt 23 is welded on by arc welding on the surface of first component 10. The welding process may be carried out here under inert gas atmosphere 32 by providing a ceramic ring 33 around bolt 23.

FIG. 2*b* shows a second component 11 being in the form of a nut 22, namely a projection nut. Nut 22 is thereby placed on the surface of first component 10 in the region of joining site 15 by a circumferentially extending projection 22*a* disposed at the end face. Projection 22*a* may be in the form of an annular or segmental projection. A suitable welding device is used to weld nut 22 onto the surface of first component 10 in the region of joining site 15. For this, a welding electrode 35 may have a centering pin 37, for example. To accommodate centering pin 37, a recess may be provided in the region of joining site 15.

In FIG. 2*c*, second component 11 is in the form of an annular fastening element, for example, an annular nut 22. In contrast to the configurations in FIGS. 2*a* and 2*b*, in FIG. 2*c*, second component 11 is not joined to first component 10 by a thermal joining method, rather by a mechanical joining method. A hole 24 is thereby placed through first component 10 in the region of joining site 15 before first component 10 is joined to second component 11. Hole 24 may be placed by boring or punching. Second component 11 is inserted into hole 24 in the region of joining site 15 and locked in position with first component 10 by suitable pressure applying means 26, 27.

FIG. 3*a* through 3*c* show different forms of pressure applying means 26, 27 for implementing method steps a) and b). In particular, pressure applying means 26, 27 may have different pressure applying surfaces 28. In FIG. 3*a*, both pressure applying means 26, 27 have convexly formed pressure applying surfaces 28. Both surfaces of first component 10 are hereby pressed in, so that depressions 25 are formed upon preparing of joining site 15.

In FIG. 3*b*, a pressure applying means 26 features a plane, respectively flat pressure applying surface 28. A surface of first component 10 hereby continues to retain a plane, respectively flat surface once joining site 15 has been prepared. Alternatively, both pressure applying means 26, 27 could also have plane pressure applying surfaces 28. A joining site, as shown in FIG. 2*b*, could be hereby produced.

FIG. 3*c* illustrates roll-shaped pressure applying means 26, 27. Such roll-shaped pressure applying means 26, 27 make it possible to place, respectively prepare a strip-like joining site 15 on first component 10.

FIG. 4 shows a device 200 for preparing a joining site. A device 200 or a plurality of, respectively different devices may be used to implement method steps a) and b) to prepare joining site 15. For this, device 200 features press tools, for example, pressure applying means 26, 27 for heating and displacing intermediate layer 14. For this purpose, a welding installation may be equipped with heating elements 29 in electrodes 35, 36, for example. Additionally provided thermocouple elements 39 may be used to regulate the desired temperature of pressure applying means 26, 27. Tempered pressure applying means 26, 27 may be used for all designs of customary resistance welding installations, such as for C-clamps, X-clamps, machine clamps, stationary and portable installations. Water cooling of the electrodes may thereby be eliminated. The service life of pressure applying means 26, 27, in the form of electrode caps, may be prolonged by providing short process times, in particular for step b) when electric voltage 17 is applied to join the two structural elements 12, 13. In addition, device 200 for dissipating heat may feature cooling bores 41. A regulator 38 may be used for processing temperature signals. By controlling compressed-air valves 40 and heating elements 29, the desired temperature may be adjusted independently of the welding parameters, environmental influences, cycle times and operating conditions.

In designing device 200 of a resistance spot welding clamp, for example, the temperature profile between pressure applying means 26, 27 and the main body, for example, the main body of the clamp, may be influenced by selectively using copper alloys and chromium nickel steels. The components made of copper alloys (for example, CuCr1Zr or CuNiSiCr) promote the flow of heat from a heating element 29 to pressure applying means 26, 27, for example, the electrode cap. The flow of heat from heating element 29 into the main body of device 200 and into other temperature-sensitive components of device 200 may be reduced by components (for example, the electrode arms of a resistance spot welding clamp) made of a relatively poorly heat-conductive chromium nickel steel. It is also conceivable to use ceramic insulating plates in this region in order to conduct as little heat as possible from pressure applying means 26, 27 to the main body of device 200. An insulating plate may be located between pressure applying means 26, 27 and the main body of device 200, for example.

Device 200 may also be used for method step c) for joining the first component to a second component in the region of joining site 15 prepared in steps a) and b).

LIST OF REFERENCE NUMERALS 100 structural element composite
200 device for preparing a joining site
10 first component
11 second component
12 first structural element of the first component
13 second structural element of the first component
14 intermediate layer
15 joining site
16 compressive force
17 electric voltage
18 first region of the displaced intermediate layer
19 second region of the displaced intermediate layer
20 third region of the displaced intermediate layer
21 temperature threshold
22 nut
22a projection
23 bolt
24 hole
25 depression
26 first pressure applying means
27 second pressure applying means
28 pressure applying surface
29 heating element
30 welding lens
31 adhesive layer
32 inert gas
33 ceramic ring
34 electric arc
35 first welding electrode
36 second welding electrode
37 centering pin
38 regulator
39 thermocouple element
40 compressed-air valve
41 cooling bore
42 maximum width of the joining site
43 maximum width of the second component

The invention claimed is:

1. A method for joining a first component to a second component at a joining site of the first component, the first component comprising at least an essentially planar first structural element, an essentially planar second structural element, and a plastic-containing intermediate layer disposed at least in certain regions between the two structural elements, the method comprising:
   (a) displacing the intermediate layer in the region of the joining site between the first structural element and second structural element in a way that establishes a contact between the first structural element and the second structural element in the region of the joining site;
   (b) applying an electric voltage to the first structural element and the second structural element in the region of the joining site until the first structural element and the second structural element adhere to each other in the region of the joining site, or a material-to-material bond is produced between the two structural elements by the melting on of the first structural element and/or of the second structural element; and
   (c) joining the first component to the second component in the region of the joining site; the second component being in the form of a fastening element for connection to another component or element.

2. The method of claim 1, wherein step a), further comprises detecting when the contact between the first structural element and the second structural element is made in the region of the joining site in order to apply the electric voltage in step b).

3. The method of claim 1, wherein, in step a), to displace the intermediate layer in the region of the joining site, a compressive force is exerted on the first component and/or the second structural element in the region of the joining site, the compressive force being exerted on the first structural element in a way that allows a depression to form on a surface of the first structural element in the region of the joining site; and the compressive force being exerted on the second structural element in a way that allows an essentially plane surface to remain on a surface of the second structural element in the region of the joining site.

4. The method of claim 1, wherein, in step c), the second component in the region of the joining site of the first component being joined to the first component by welding.

5. The method of claim 1, wherein the second component is in the form of a nut or bolt.

6. The method of claim 1, wherein, in step c), before the first component is joined to the second component, a hole is bored or punched through the first component in the region of the joining site.

7. The method as recited in claim 6, wherein the second component is inserted into the hole and, in order to be joined to the first component, is locked in position therewith.

\* \* \* \* \*